(12) United States Patent
Masui

(10) Patent No.: US 8,269,710 B2
(45) Date of Patent: Sep. 18, 2012

(54) ELECTRO-OPTICAL DEVICE AND ELECTRONIC APPARATUS

(75) Inventor: Junichi Masui, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 746 days.

(21) Appl. No.: 12/371,238

(22) Filed: Feb. 13, 2009

(65) Prior Publication Data

US 2009/0213054 A1    Aug. 27, 2009

(30) Foreign Application Priority Data

Feb. 22, 2008  (JP) .................................. 2008-041245

(51) Int. Cl.
G09G 3/36    (2006.01)
G02F 1/1345  (2006.01)

(52) U.S. Cl. ............ 345/98; 345/88; 345/100; 349/149; 349/151

(58) Field of Classification Search ........................ None
See application file for complete search history.

(56) References Cited

U.S. PATENT DOCUMENTS 7,804,473 B2 * 9/2010 Kumeta ......................... 345/96

FOREIGN PATENT DOCUMENTS

| JP | 2002-49331 A | 2/2002 |
| JP | 2005-77483 A | 3/2005 |
| JP | 3841074 B | 11/2006 |

* cited by examiner

Primary Examiner — Daniell L Negron
(74) Attorney, Agent, or Firm — AdvantEdge Law Group, LLC

(57) ABSTRACT

An electro-optical device includes red, green, and blue sub pixels and red, green, and blue data lines connected to the corresponding sub pixels. Red, green, and blue sampling switches are provided in a peripheral region and are electrically connected to data lines of the corresponding color. The green sampling switch is located at a position that is closer to the pixel region than are the red or blue sampling switches.

3 Claims, 6 Drawing Sheets

ELECTRO-OPTICAL DEVICE AND ELECTRONIC APPARATUS

BACKGROUND

1. Technical Field

The present invention relates to an electro-optical device such as a liquid crystal device and an electronic apparatus including the electro-optical device, such as a liquid projector.

2. Related Art

A liquid crystal device as an example of an electro-optical device is driven on the basis of an image signal supplied from an external circuit to an image signal line. The image signal is supplied from the image signal line to a plurality of data lines mounted in a pixel region of a substrate (that is, a region in which a plurality of pixels are, for example, arranged in a matrix) via a sampling circuit (for example, see Japanese Patent No. 3841074 and JP-A-2002-49331). The sampling circuit is provided in a peripheral region located on the periphery of the pixel region and includes a plurality of sampling switches respectively provided in the data lines. Each of the sampling switches is constituted by a one-channel type or complementary type thin film transistor (TFT). A source of each of the sampling switches constituted by the TFTs is electrically connected with the image signal line, a drain thereof is electrically connected with the data line, and a gate thereof is electrically connected with a sampling signal line for supplying a sampling signal.

For example, in Japanese Patent No. 3841074, a technology of reducing the occurrence of defective images caused by a parasitic capacity between the plurality of sampling switches by the reverse arrangement of the source line and the drain line with the gate of the TFT configuring the sampling switch interposed therebetween with respect to two sampling switches which are adjacent with a border line of a group of n sampling switches connected to n data lines, which are driven simultaneously, of the plurality of data lines is disclosed. For example, in JP-A-2002-49331, a technology of reducing a parasitic capacity between the image signal line and the data line in the vicinity of the sampling switch by arranging adjacent sampling switches at a predetermined gap in a longitudinal direction of the sampling switches is suggested.

An example of the electro-optical device includes color display liquid crystal device having sub pixels of R (red), G (green) and B (blue). In such a color display liquid crystal device, one unit pixel (dot) is divided into three sub pixels, three color filters of R, G and B are arranged at positions corresponding to the sub pixels, and one unit pixel is displayed by the three sub pixels corresponding to three colors of R, G and B, thereby realizing a color display. In such a color display liquid crystal device, since the sampling switches are provided in correspondence with the data lines corresponding to the sub pixels of R, G and B, it is difficult to arrange the sampling switches in a line in the arrangement direction of the data lines in the peripheral region of the substrate. In order to solve this problem, like JP-A-2002-49331, the plurality of sampling switches are arranged in the arrangement direction of the data lines and are arranged so as to form a plurality of rows which are shifted to each other in a direction in which the data lines extend.

If the image signal is supplied to the data line via the sampling switch, an output line of the sampling switch (and the data line electrically connected thereto) is in a floating state (that is, an electrical floating state) in a period in which the sampling switch is in an off state (that is, a non-conduction state). Accordingly, a variation in voltage is susceptible to be generated due to capacitive coupling with other lines in the output line of the sampling switch. Accordingly, a display failure may occur in the pixel region by the variation in voltage of the image signal maintained in the data line electrically connected to the output line of the sampling switch.

SUMMARY

An advantage of some aspects of the invention is that it provides an electro-optical device in which an adverse influence on the display due to a variation in voltage generated in data lines is unlikely to be viewed and a high-quality color image can be displayed, and an electronic apparatus including the electro-optical device.

According to an aspect of the invention, there is provided an electro-optical device including: a plurality of unit pixels configured by sub pixels corresponding to colors including red, green and blue; a plurality of data liens which are arranged in one direction in a pixel region in which the plurality of unit pixels are arranged, and are electrically connected to the sub pixels according to the colors; image signal lines which are provided in a peripheral region located at the periphery of the pixel region and supplies image signals; a plurality of red sampling switches which are provided in red data lines electrically connected to the sub pixels corresponding to red among the plurality of data lines in the peripheral region and samples and supplies the image signals to the red data lines; a plurality of green sampling switches which are provided in green data lines electrically connected to the sub pixels corresponding to green among the plurality of data lines in the peripheral region and samples and supplies the image signals to the green data lines; and a plurality of blue sampling switches which are provided in blue data lines electrically connected to the sub pixels corresponding to blue among the plurality of data lines in the peripheral region and samples and supplies the image signals to the blue data lines, wherein the plurality of green sampling switches are arranged closer to the pixel region than the plurality of red sampling switches and the plurality of blue sampling switches.

According to the electro-optical device of the invention, each of the red sampling switches, the green sampling switches and the blue sampling switches is constituted by a one-channel type or complementary thin film transistor. The sources of the red sampling switches are electrically connected with the image signal lines, the drains thereof are electrically connected with the red data lines, and the gates thereof are electrically connected with, for example, sampling signal lines for supplying sampling signals. The sources of the green sampling switches are electrically connected with the image signal lines, the drains thereof are electrically connected with the green data lines, and the gates thereof are electrically connected with, for example, the sampling signal lines for supplying the sampling signals. The sources of the blue sampling switches are electrically connected with the image signal lines, the drains thereof are electrically connected with the blue data lines, and the gates thereof are electrically connected with, for example, the sampling signal lines for supplying the sampling signals.

At the time of the operation of the electro-optical device of the invention, for example, the sampling signals are supplied from the data line driving circuit to the gates of the red sampling switches, the green sampling switches and the blue sampling switches via the sampling signal lines. The image signals supplied to the image signal lines are sampled by the red sampling switches, the green sampling switches and the blue sampling switches in response to the sampling signals and are supplied to the plurality of data lines (that is, the red data lines, the green data lines and the blue data lines). In addition, for example, the scan signals are sequentially supplied from the scan line driving circuit to the scan lines. Accordingly, in the sub pixels each including the pixel switching element, the pixel electrode and the storage capacitor, the electro-optical operation such as liquid crystal driving is performed in the unit of sub pixels. As a result, it is possible to realize a color display in the pixel region.

In the invention, the plurality of green sampling switches are arranged closer to the pixel region than the plurality of red sampling switches and the plurality of blue sampling switches.

Typically, the plurality of green sampling switches are arranged in a different direction (that is, a direction crossing one direction, for example, in a direction in which the scan lines extend or an X direction), and the plurality of red sampling switches and the plurality of blue sampling switches are arranged further than the arrangement of the plurality of green sampling switches from the pixel region according to the plurality of green sampling switches. That is, the plurality of green sampling switches, the plurality of red sampling switches and the plurality of blue sampling switches are arranged in different directions according to the colors and are shifted in one direction such that three rows are formed and the green sampling switches are closer to the pixel region than the red sampling switches and the blue sampling switches.

Accordingly, the output lines of the green sampling switches (the lines led from the green sampling switches to the data lines in the peripheral region in order to electrically connect the green sampling switches arranged in the peripheral region and the data lines arranged in the pixel region) can be shorter than those of the plurality of red sampling switches and the plurality of blue sampling switches. Accordingly, among the output lines of the green sampling switches, the red sampling switches and the blue sampling switches, it is possible to minimize a variation in voltage due to capacitive coupling with other lines in the output lines of the green sampling switches. Accordingly, it is possible to suppress the variation in voltage in the green data lines corresponding to green having high visibility (or visual efficiency) of human. Even when the variation in voltage is generated in the red data lines and the blue data lines corresponding to red and blue, an adverse influence on the display is not substantially generated because red and blue have the visibility of human lower than that of green. As a result, it is possible to display high-quality color image.

As described above, according to the electro-optical device of the invention, it is difficult to view the adverse influence on the display due to the variation in voltage which may be generated in the data lines and it is possible to display a high-quality image.

In the electro-optical device of the invention, the plurality of blue sampling switches may be arranged further than the plurality of red sampling switches from the pixel region.

By this configuration, the variation in voltage of the red data lines can be lower than that of the blue data lines. Since blue has the visibility of human lower than that of red, it is difficult to view an adverse influence on the display due to the variation in voltage which may be generated in the data lines, compared with the case where the plurality of red sampling transistors are arranged further than the plurality of blue sampling transistors from the pixel region.

In the electro-optical device of the invention, the plurality of red sampling switches, the plurality of green sampling switches and the plurality of blue sampling switches may be arranged in different directions crossing one direction and may be shifted in one direction.

By this configuration, the plurality of red sampling switches, the plurality of green sampling switches and the plurality of blue sampling switches are arranged so as to form one row in different directions and are arranged in three rows in one direction. Accordingly, each of the red sampling switches, the green sampling switches and the blue sampling switches are configured by a thin film transistor having a size larger than that of each of the sub pixels and can be readily arranged in the peripheral region.

An electronic apparatus of the invention includes the above-described electro-optical device.

Since the electronic apparatus of the invention includes the electro-optical device of the invention, it is possible to realize various types of electronic apparatuses capable of realizing a high-quality color display, such as a projective display device, a television set, a mobile telephone, an electronic organizer, a word process, a viewfinder-type or direct-view monitor type video tape recorder, a workstation, a video-phone, a POS terminal, and a touch-panel-equipped device. In addition, as the electronic apparatus of the invention, an electromigration device such as an electronic paper, an electron emitting device (a field emission display and a conduction electron-emitter display), and a display apparatus using the electromigration device and the electron emitting device can be realized.

These and other operations and advantages of the invention will become more fully apparent from the following detailed description.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. In the following embodiments, for example, a TFT active matrix driving type liquid crystal device including a driving circuit therein, which is an example of an electro-optical device of the invention, will be described.

First Embodiment

A liquid crystal device according to a first embodiment will be described with reference to FIGS. 1 to 5.

Figure 1:
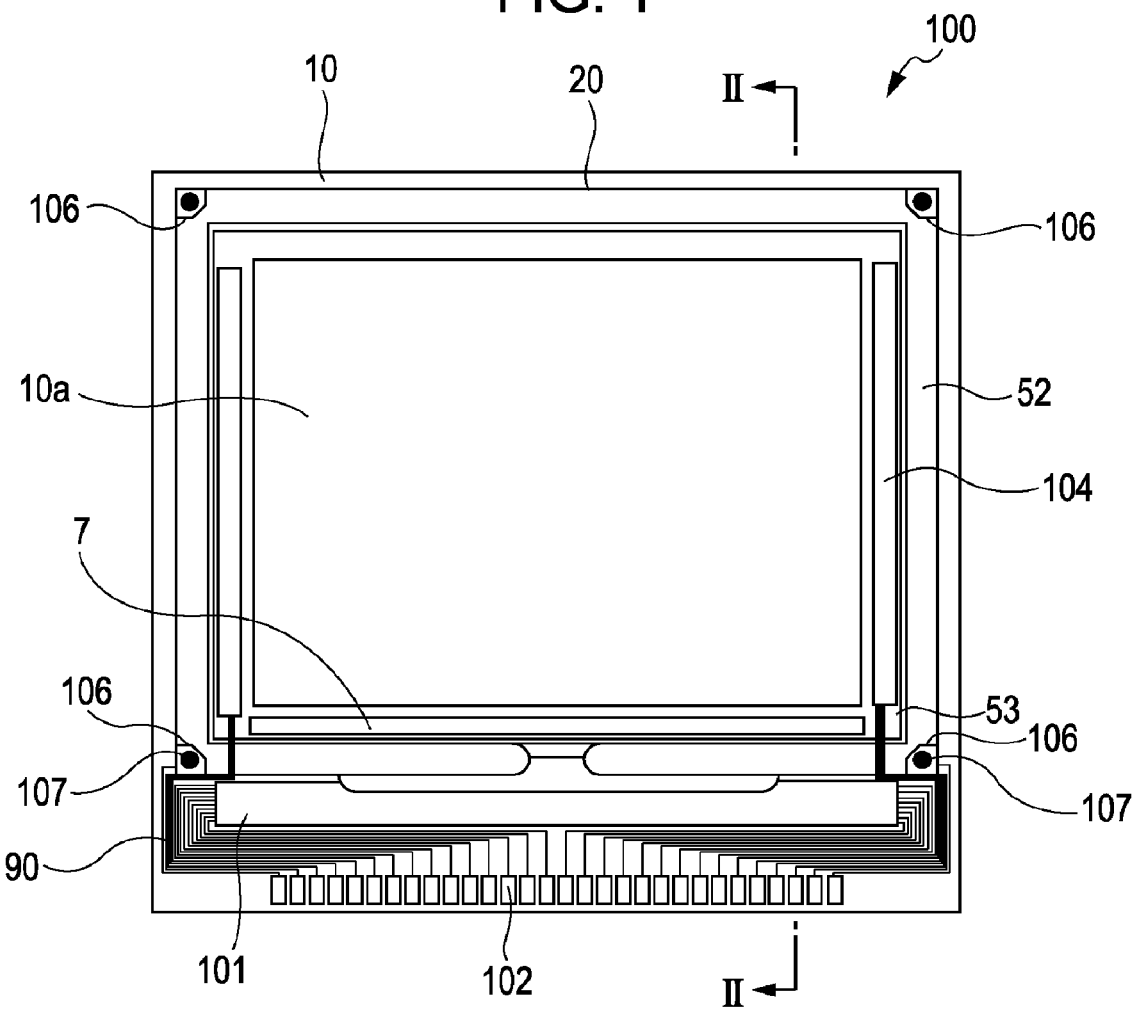
FIG. 1 is a plan view showing the configuration of a liquid crystal device according to a first embodiment of the invention.
Figure 2:
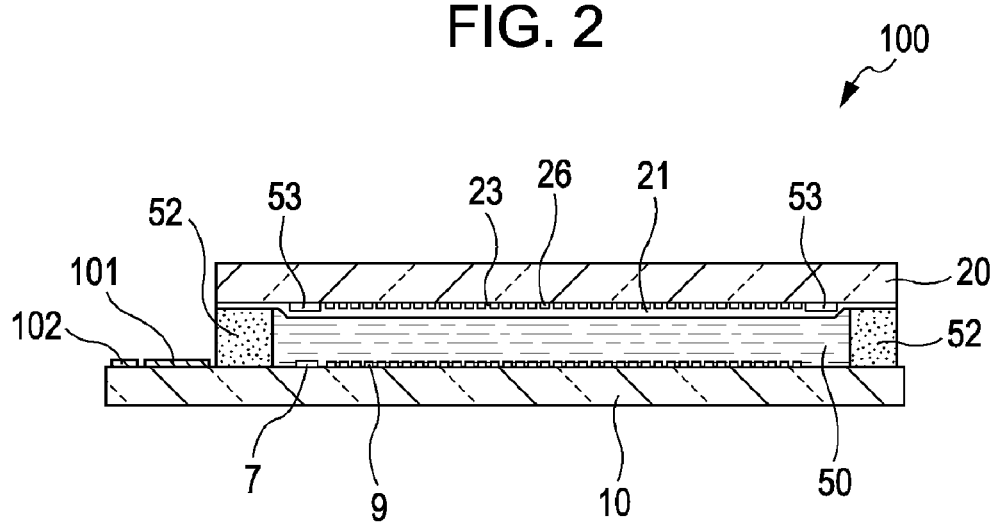
FIG. 2 is a cross-sectional view taken along line II-II of FIG. 1.

First, the whole configuration of the liquid crystal device according to the present embodiment will be described with reference to FIGS. 1 and 2. FIG. 1 is a plan view showing the configuration of a liquid crystal device according to the present embodiment. FIG. 2 is a cross-sectional view taken along line II-II of FIG. 1.

In FIGS. 1 and 2, in the liquid crystal device 100 of the present embodiment, a TFT array substrate 10 and a counter substrate 20 face each other. A liquid crystal layer 50 is interposed between the TFT array substrate 10 and the counter substrate 20. The TFT array substrate 10 and the counter substrate 20 are adhered to each other by a seal material 52 provided in a seal region located at the periphery of an image display region 10a as an example of a "pixel region" of the invention.

In FIG. 1, a frame light-shielding film 53 defining a frame region of the image display region 10a is provided on the counter substrate 20 in parallel to the inside of the seal region in which the seal material 52 is arranged. In the present embodiment, a peripheral region defining the periphery of the image display region 10a exists. In other words, in the present embodiment, a region further than the frame light-shielding film 53 from the center of the TFT array substrate 10 is defined as the peripheral region.

In a region, which is located at the outside of the seal region in which the seal material 52 is arranged, of the peripheral region, a data line driving circuit 101 and an external circuit connection terminal 102 are provided along one side of the TFT array substrate 10. A sampling circuit 7 is provided at the inside of the seal region arranged along one side so as to cover the frame light-shielding film 53. A scan line driving circuit 104 is provided at the inside of the seal region arranged in two sides adjacent to one side so as to cover the frame light-shielding film 53. On the TFT array substrate 10, an upper/lower conducting terminal 106 for connecting the both substrates by an upper/lower conducting material 107 is provided in regions facing four corners of the counter substrate 20. Accordingly, an electrical conduction between the TFT array substrate 10 and the counter substrate 20 is made.

On the TFT array substrate 10, a lead line 90 for electrically connecting the external circuit connection terminal 102, the data line driving circuit 101, the scan line driving circuit 104 and the upper/lower conducting terminal 106 is formed.

In FIG. 2, on the TFT array substrate 10, a lamination structure including pixel switching TFTs, scan lines and data lines is formed. In the image display region 10a, pixel electrodes 9 are provided on the lines including the pixel switching TFTs, the scan lines and the data lines in a matrix. An alignment film is formed on the pixel electrodes 9. On the surface of the counter substrate 20 facing the TFT array substrate 10, color filters 26 are formed with a predetermined thickness so as to face the pixel electrodes 9. In the present embodiment, one unit pixel is constituted by three sub pixels, and each pixel electrode 9, each pixel switching TFT and each color filter 26 are provided in each sub pixel. In the three sub pixels configuring the unit pixel, a red (R) color filter, a green (G) color filter and a blue (B) color filter are respectively provided. The red color filter is a color filter which passes only red light (that is, for example, light having a wavelength of 625 to 740 nm), the green color filter is a color filter which passes only green light (that is, for example, light having a wavelength of 500 to 565 nm), and the blue color filter is a color filter which passes only blue light (that is, for example, light having a wavelength of 450 to 485 nm). The color filters 26 may be provided on the TFT array substrate 10.

On the surface of the counter substrate 20 facing the TFT array substrate 10, a light-shielding film 23 is formed between adjacent color filters 26. The light-shielding film 23 is formed of, for example, a light-shielding metal film and is patterned, for example, in a lattice shape in the image display region 10a on the counter substrate 20. A counter electrode 21 formed of a transparent material such as indium tin oxide (ITO) is solidly formed on a protective film (not shown) formed on the color filters 26 and the light-shielding film 23 so as to face the plurality of pixel electrodes 9. An alignment film is formed on the counter electrode 21. The liquid crystal layer 50 is constituted by liquid crystal obtained by mixing one type or various types of nematic liquid crystal, and a predetermined alignment state is obtained between a pair of alignment films.

Although not shown, a test circuit and a test pattern for testing the quality or the defect of the liquid crystal device during manufacturing or before shipment may be formed on the TFT array substrate 10, in addition to the data line driving circuit 101 and the scan line driving circuit 104.

Figure 3:
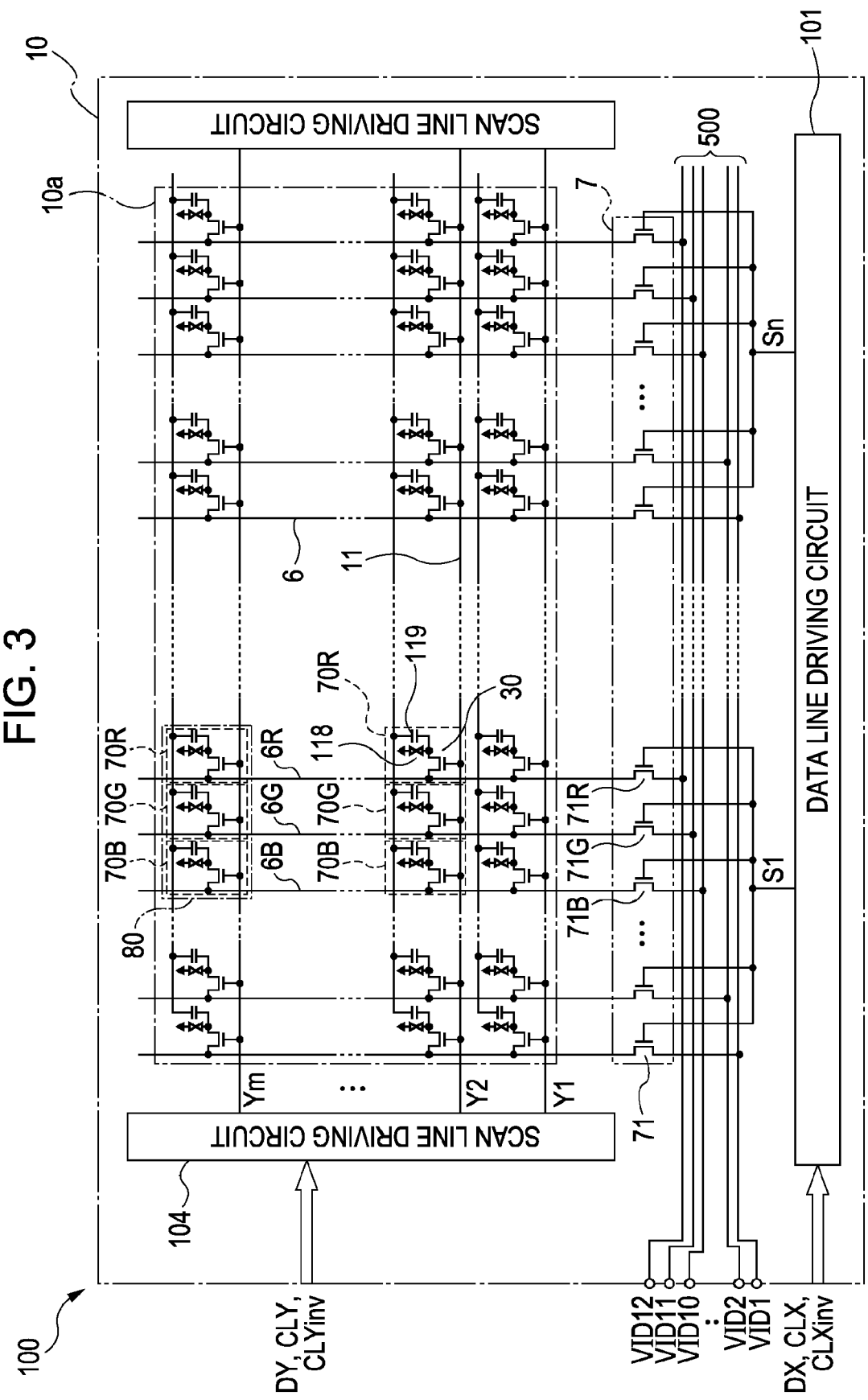
FIG. 3 is a block diagram showing the electrical configuration of the liquid crystal device according to the first embodiment of the invention.

Next, the electrical configuration of the liquid crystal device according to the present embodiment will be described with reference to FIG. 3. FIG. 3 is a block diagram showing the electrical configuration of the liquid crystal device according to the present embodiment.

As shown in FIG. 3, the liquid crystal device 100 includes the data lines 6 (that is, the data lines 6R, 6G and 6B) and the scan lines 11 arranged in the image display region 10a which occupies the central portion of the TFT array substrate 10, and sub pixels 70 are formed in correspondence with intersections of the lines. Each of the sub pixels 70 includes the pixel electrode 9 of a liquid crystal element 118, a TFT 30 for switching and controlling the pixel electrode 9 and a storage capacitor 119. In the present embodiment, the total number of scan lines 11 is m (m is a natural number of 2 or more) and the total number of data lines 6 is n (n is a natural number of 2 or more).

In the present embodiment, the unit pixel 80 is constituted by three sub pixels 70 (that is, the sub pixels 70R, 70G and 70B) which are adjacent in a direction (that is, an X direction) in which the scan lines 11 extend. On the counter substrate 20, the red color filter 26 is provided so as to face the pixel electrode 9 of the sub pixel 70R, the green color filter 26 is provided so as to face the pixel electrode 9 of the sub pixel 70G, and the blue color filter 26 is provided so as to face the pixel electrode 9 of the sub pixel 70B. Accordingly, the color display of the unit pixel 80 is realized. In the present embodiment, the red, green and blue color filters 26 are provided in a stripe shape in a direction (that is, a Y direction) in which the data lines 6 extend. Any one of the red, green and blue sub pixels 70 is electrically connected to one of the data lines 6. That is, the red sub pixel 70R is electrically connected to the data line 6B, the green sub pixel 70G is electrically connected to the data line 6G, and the blue sub pixel 70B is electrically connected to the data line 6B.

As shown in FIG. 3, the liquid crystal device 100 includes the scan line driving circuit 104, the data line driving circuit 101, the sampling circuit 7 and image signal lines 500 in the peripheral region on the TFT array substrate 10.

A Y clock signal CLY, an inversion Y clock signal CLYinv and a Y start pulse DY are supplied from an external circuit to the scan line driving circuit 104 via the external circuit connection terminal 102 (see FIG. 1). When the Y start pulse DY is input, the scan line driving circuit 104 sequentially generates and outputs scan signals Y1, . . . , and Ym at timings based on the Y clock signal CLY and the inversion Y clock signal CLYinv.

An X clock signal CLX, an inversion X clock signal CLX-inv and an X start pulse DX are supplied from an external circuit to the data line driving circuit 101 via the external circuit connection terminal 102 (see FIG. 1). When the X start pulse DX is input, the data line driving circuit 101 sequentially generates and outputs sampling signals S1, . . . , and Sn at timings based on the X clock signal CLX and the inversion X clock signal CLXinv.

The sampling circuit 7 includes a plurality of sampling transistors 71 provided in every data line 6. In more detail, the sampling circuit 7 includes a plurality of sampling transistors 71R provided in every data line 6R electrically connected to the red sub pixel 70R, a plurality of sampling transistors 71G provided in every data line 6G electrically connected to the green sub pixel 70G and a plurality of sampling transistors 71B provided in every data line 6B electrically connected to the blue sub pixel 70B. Each of the sampling transistors 71R, 71G and 71B is constituted by one-channel type TFT. The sampling transistor 71R is an example of a red sampling switch of the invention, the sampling transistor 71G is an example of a green sampling switch of the invention, and the sampling transistor 71B is an example of a blue sampling switch of the invention. The layout of the sampling transistors 71R, 71G and 71B on the TFT array substrate 10 will be described in detail later.

The number of image signal lines 500 is 12 in the present embodiment. Image signals VID1 to VID12 in which an image signal of one system is serial-parallel developed (or phase developed) to 12 phases by an external image processing circuit are supplied to the liquid crystal device 100 via the image signal lines 500. As described below, n data lines 6 are sequentially driven in every data line group including 12 data lines 6 corresponding to the number of image signal lines 500.

The sampling signal Si (i=1, 2, . . . , and n) is sequentially supplied from the data line driving circuit 101 to every sampling transistor 71 corresponding to the data line group, and the sampling transistors 71 is switched between an on state (that is, a conduction state) and an off state (that is, a non-conduction state) in response to the sampling signals Si. The image signals VID1 to VID12 from the 12 image signal lines 500 are simultaneously supplied to the data lines 6 belonging to the data line group and are sequentially to every data line group via the sampling transistors 71 which are turned on. Accordingly, the data lines 6 belonging to one data line group are simultaneously driven. In the present embodiment, since the 12 data lines 6 are driven in every data line group, a driving frequency is suppressed.

In FIG. 3, in the configuration of one sub pixel 70, the data line 6 to which the image signal VIDk (k=1, 2, 3, . . . , and 12) is supplied is electrically connected to the source electrode of the TFT 30, the scan line 11 to which the scan signal Yj (j=1, 2, 3, . . . , and m) is supplied is electrically connected to the gate electrode of the TFT 30, and the pixel electrode 9 of the liquid crystal element 118 is electrically connected to the drain electrode of the TFT 30. In each sub pixel 70, the liquid crystal element 118 is obtained by interposing liquid crystal between the pixel electrode 9 and the counter electrode 21. In order to prevent the held image signal from being leaked, the storage capacitor 119 is added in parallel to the liquid crystal element 118.

By the scan signals Y1, . . . , and Ym output from the scan line driving circuit 104, the scan lines 11 are linear sequentially selected. In the sub pixel 70 corresponding to the selected scan line 11, if the scan signal Yj is supplied to the TFT 30, the TFT 30 is turned on and the sub pixel 70 is selected. By closing the switch of the TFT 30 in a predetermined period, the image signal VIDk is supplied from the data line 6 to the pixel electrode 9 of the liquid crystal element 118 at a predetermined timing. Accordingly, an applied voltage defined by the voltage of the pixel electrode 9 and the counter electrode 21 is applied to the liquid crystal element 118. The liquid crystal modulates the light and realizes a gradation display by changing the alignment or order of molecules by the level of the applied voltage.

Figure 4:
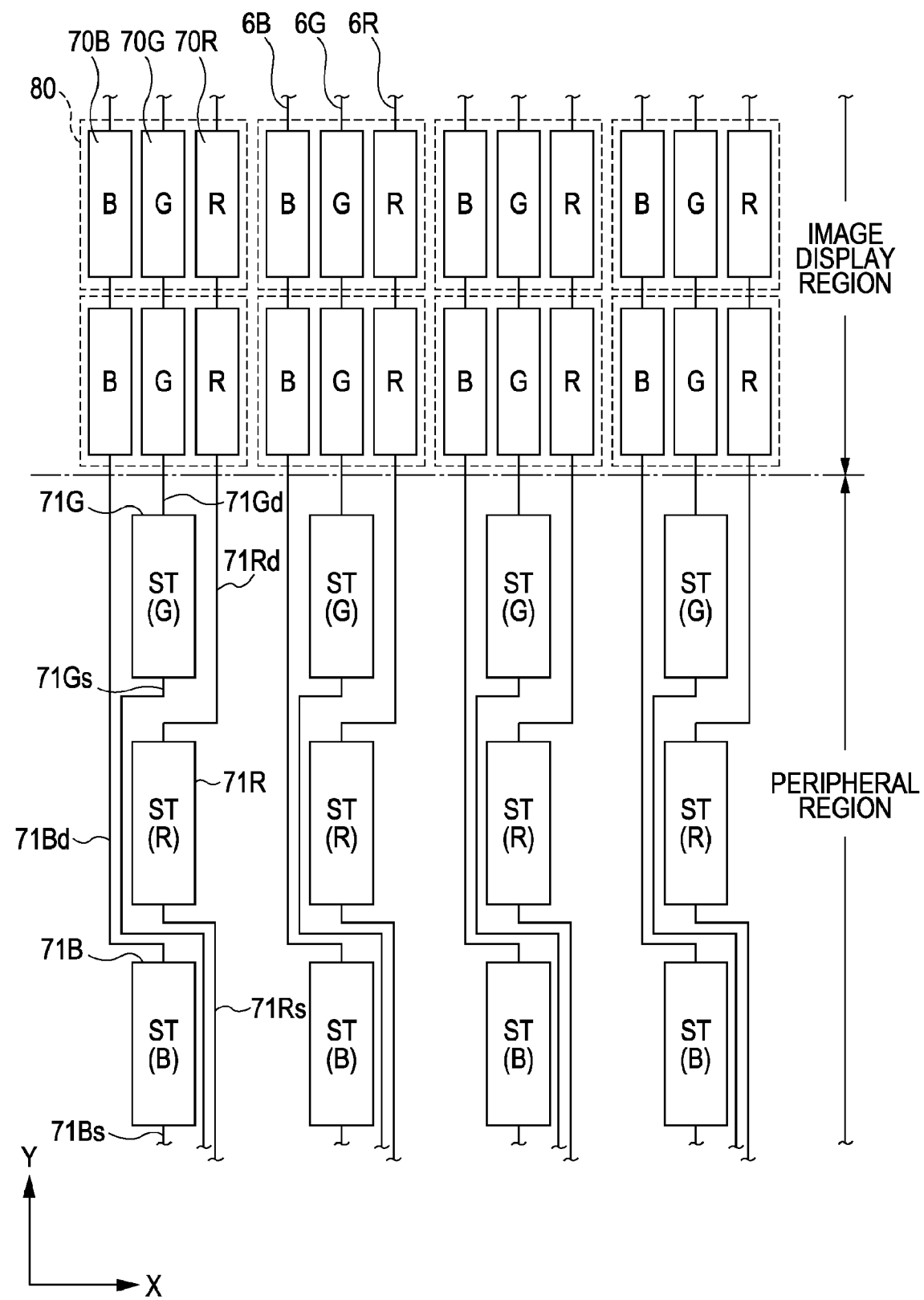
FIG. 4 is a schematic plan view showing the layout of a sampling transistor of the liquid crystal device according to the first embodiment of the invention.
Figure 5:
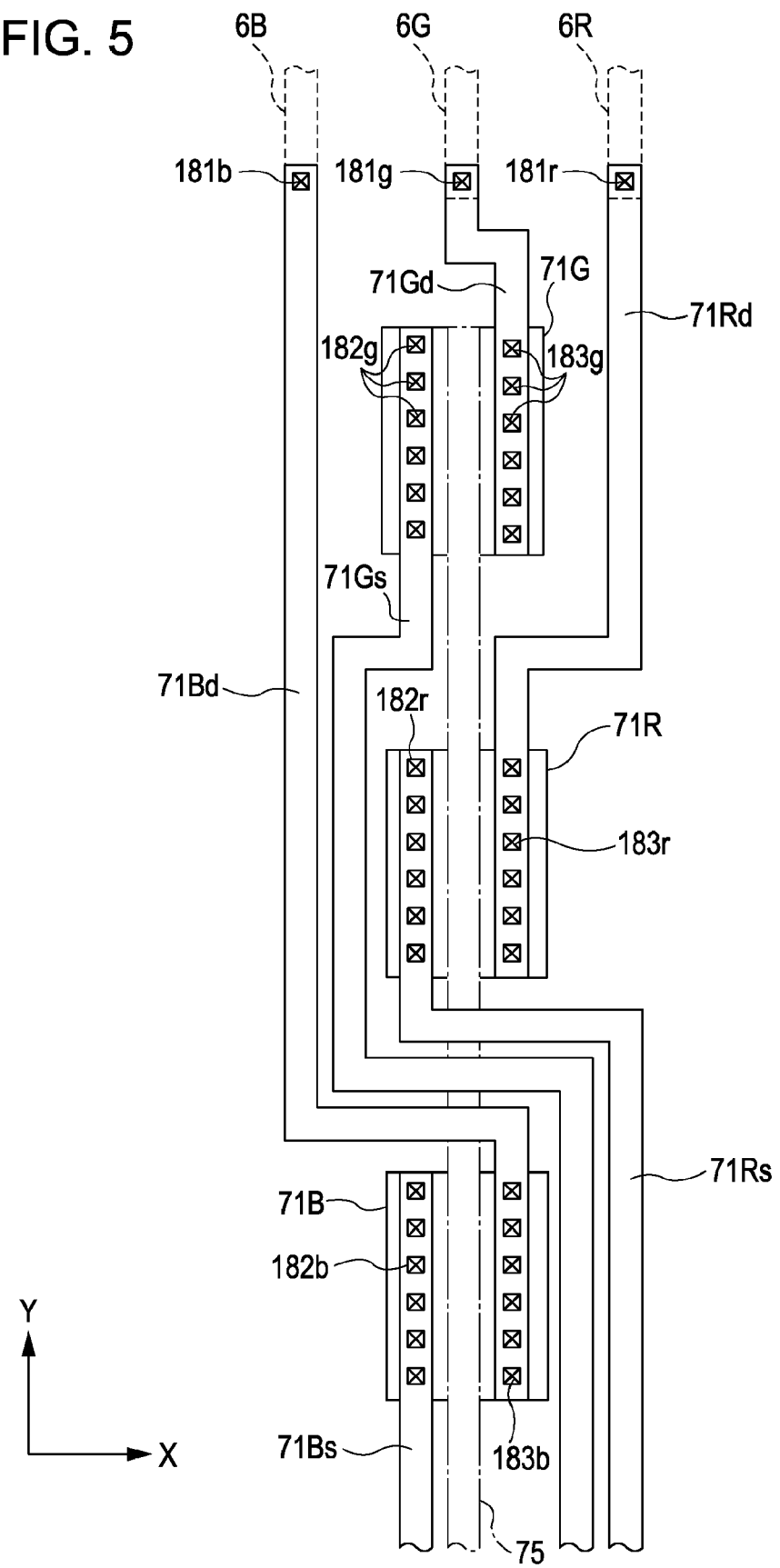
FIG. 5 is a plan view showing the layout of a line of the sampling transistor of the liquid crystal device according to the first embodiment of the invention.

Next, the layout of the sampling transistor of the liquid crystal device according to the present embodiment will be described with reference to FIGS. 4 and 5. FIG. 4 is a schematic plan view showing the layout of a sampling transistor of the liquid crystal device according to the present embodiment. FIG. 5 is a plan view showing the layout of a line of the sampling transistor of the liquid crystal device according to the present embodiment.

As shown in FIG. 4, the plurality of sampling transistors 71 (that is, the plurality of sampling transistors 71R, 71G and 71B) are arranged in the X direction and are shifted in the Y direction according to the colors of the corresponding sub pixels 70, in the peripheral region located at the periphery of the image display region 10a in which the unit pixels 80 are arranged in a matrix. That is, the plurality of sampling transistors 71G corresponding to green are arranged in the X direction, the plurality of sampling transistors 71R corresponding to red are arranged in the X direction at the side further than the arrangement of the plurality of sampling transistors 71G from the image display region 10a in the Y direction, and the plurality of sampling transistors 71B corresponding to blue are arranged in the X direction at the side further than the arrangement of the plurality of sampling transistors 71R from the image display region 10a in the Y direction. The sampling transistors 71G, 71R and 71B corresponding to the sub pixels 70G, 70R and 70B configuring the same unit pixel 80 are arranged in the Y direction.

That is, in the present embodiment, the plurality of sampling transistors 71 are not arranged in one row in the X direction and are arranged in three rows in the X direction according to the colors of the corresponding sub pixels 70. Accordingly, even when the arrangement pitch of the sub pixel 70 is small, it is possible to readily arrange the plurality of sampling transistors 71 in the peripheral region while the size of the sampling transistors 71 is sufficiently ensured.

In FIG. 5, a source line 71Gs of the sampling transistor 71G is electrically connected to a source region of a semiconductor layer configuring the sampling transistor 71G via a contact hole 182g. The source line 71Gs is electrically connected to the corresponding image signal line 500 via, for example, a contact hole, in the opposite side of the side connected to the sampling transistor 71G (see FIG. 3). A drain line 71Gd of the sampling transistor 71G is electrically connected to a drain region of the semiconductor layer configuring the sampling transistor 71G via a contact hole 183g. The drain line 71Gd is electrically connected to the corresponding data line 6G via a contact hole 181g, in the opposite side of the side connected to the sampling transistor 71G.

A source line 71Rs of the sampling transistor 71R is electrically connected to a source region of a semiconductor layer configuring the sampling transistor 71R via a contact hole 182r. The source line 71Rs is electrically connected to the corresponding image signal line 500 via, for example, a contact hole, in the opposite side of the side connected to the sampling transistor 71R (see FIG. 3). A drain line 71Rd of the sampling transistor 71R is electrically connected to a drain region of the semiconductor layer configuring the sampling transistor 71R via a contact hole 183r. The drain line 71Rd is electrically connected to the corresponding data line 6R via a contact hole 181r, in the opposite side of the side connected to the sampling transistor 71R.

A source line 71Bs of the sampling transistor 71B is electrically connected to a source region of a semiconductor layer configuring the sampling transistor 71B via a contact hole 182b. The source line 71Bs is electrically connected to the corresponding image signal line 500 via, for example, a contact hole, in the opposite side of the side connected to the sampling transistor 71B (see FIG. 3). A drain line 71Bd of the sampling transistor 71B is electrically connected to a drain region of the semiconductor layer configuring the sampling transistor 71B via a contact hole 183b. The drain line 71Bd is electrically connected to the corresponding data line 6B via a contact hole 181b, in the opposite side of the side connected to the sampling transistor 71B.

In FIG. 5, a sampling signal line 75 is formed so as to include the gate electrodes of the sampling transistors 71G, 71R and 71B corresponding to the sub pixels 70G, 70R and 70B configuring the same unit pixel 80. The sampling signal line 75 is electrically connected to the data line driving circuit 101 in the opposite side of the side including the gate electrodes (see FIG. 3). At the time of the operation of the liquid crystal device 100, the sampling signal Si is supplied from the data line driving circuit 101 to the sampling signal line 75 at a predetermined timing.

In FIGS. 4 and 5, in the present embodiment, in particular, the plurality of sampling transistors 71G are arranged closer to the image display region 10a than the plurality of sampling transistors 71R and the plurality of sampling transistors 71B.

Accordingly, the drain line 71Gd of the sampling transistor 71G is shorter than the drain lines 71Rd and 71Bd of the sampling transistors 71R and 71B. Therefore, among the drain lines 71Gd, 71Rd and 71Bd of the sampling transistors 71G, 71R and 71B, a variation in voltage due to capacitive coupling with other lines is unlikely to be generated in the drain line 71Gd of the sampling transistor 71G. Thus, it is possible to suppress the variation in voltage of the data line 6G electrically connected to the sub pixel 70G corresponding to green having a highest visibility of human (that is, a color which is susceptible to be viewed by human) of red, blue and green. Even when the variation in voltage is generated in the data lines 6R and 6B electrically connected to the sub pixels 70R and 70B corresponding to red and blue, an adverse influence on the display is not substantially generated because red and blue have the visibility of human lower than that of green. As a result, it is possible to display high-quality color image.

In the present embodiment, the plurality of sampling transistors 71B are arranged father than the plurality of transistors 71R from the image display region 10a.

Accordingly, the variation in voltage of the data line 6R electrically connected to the sub pixel 70R corresponding to red is lower than that of the data line 6B electrically connected to the sub pixel 70B corresponding to blue. Since blue has the visibility of human lower than that of red, it is difficult to view an adverse influence on the display due to the variation in voltage which may be generated in the data lines 6, compared with the case where the plurality of sampling transistors 71R are arranged further than the plurality of transistors 71B from the image display region 10a.

As described above, according to the liquid crystal device of the present embodiment, it is difficult to view the adverse influence on the display due to the variation in voltage which may be generated in the data lines 6 and it is possible to display a high-quality image.

Electronic Apparatus

Next, various types of electronic apparatuses including the liquid crystal device as the electro-optical device will be described.

Figure 6:
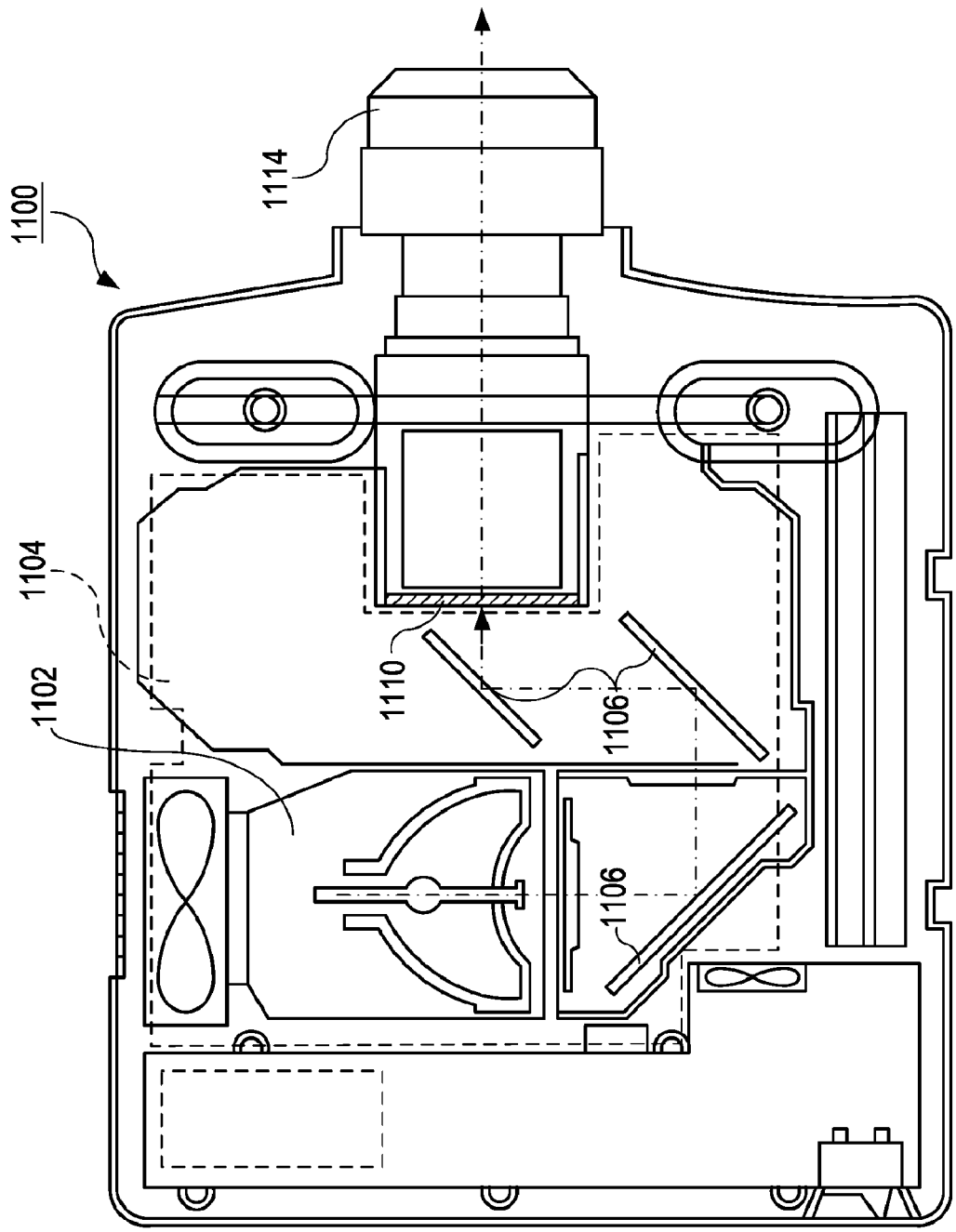
FIG. 6 is a plan view showing the configuration of a projector which is an example of an electronic apparatus including the electro-optical device.

First, a projector, which uses the present liquid crystal device as a light valve, will be described with reference to FIG. 6. FIG. 6 is a plan view showing the configuration of the projector.

As shown in FIG. 6, a lamp unit 1102 composed of a white light source such as a halogen lamp and the like is provided inside the projector 1100. Light emitted from the lamp unit 1102 is made incident to a liquid crystal panel 1110 by three mirrors 1106 arranged in a light guide 1104.

The configuration of the liquid crystal panel 1110 is equal to the above-described liquid crystal device, which is driven by RGB image signals supplied from an image signal processing circuit. A color image displayed by modulating the light by the liquid crystal panel 1110 is projected to a screen via a projector lens 1114.

Figure 7:
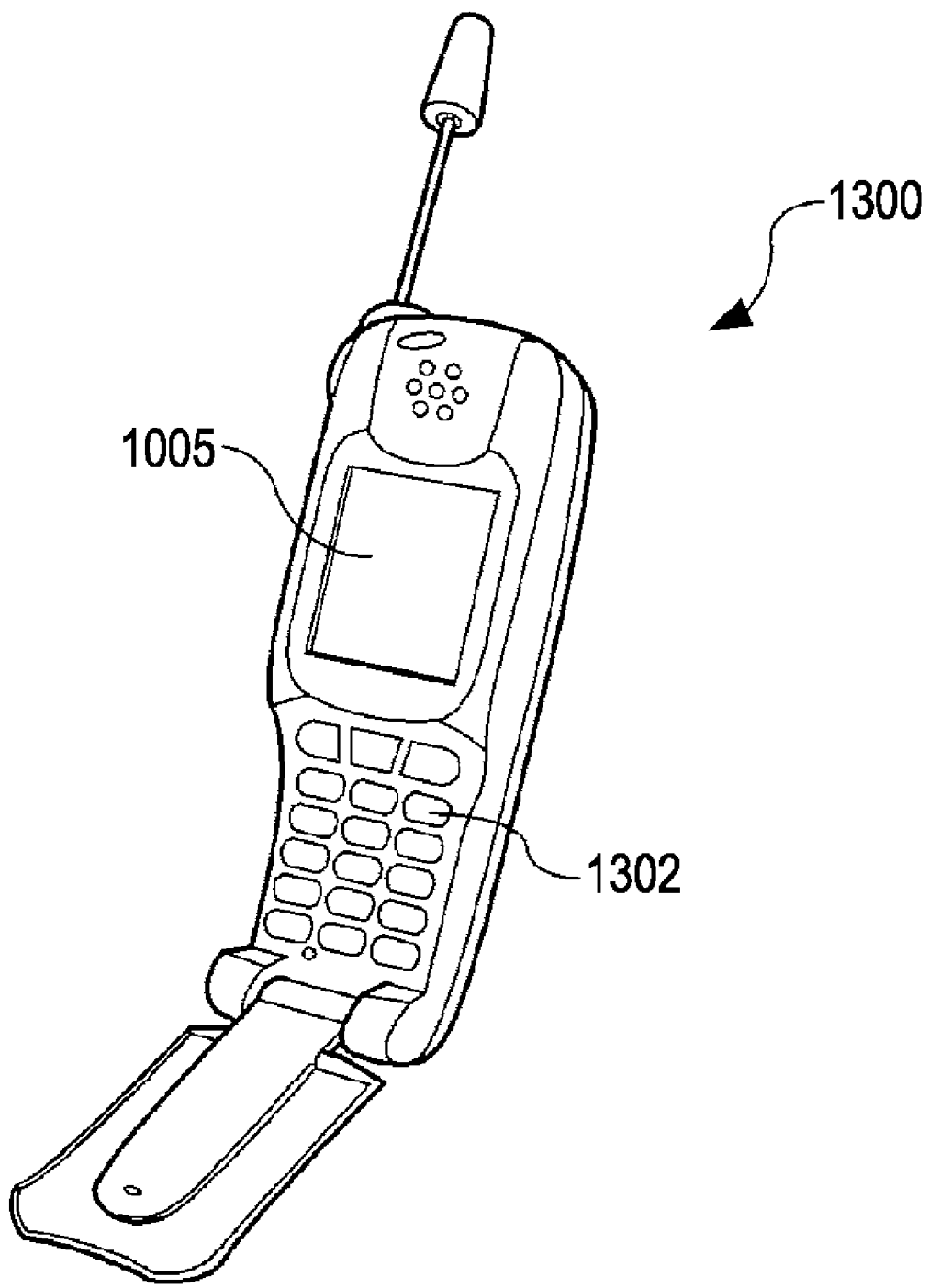
FIG. 7 is a plan view showing the configuration of a mobile telephone which is an example of an electronic apparatus including the electro-optical device.

Next, a mobile telephone including the above-described liquid crystal device will be described with reference to FIG. 7. FIG. 7 is a perspective view showing the configuration of the mobile telephone.

In FIG. 7, the mobile telephone 1300 includes a plurality of operation buttons 1302 and a display unit 1005 including the above-described liquid crystal device.

In addition to the electronic apparatus described in FIGS. 6 and 7, there are a mobile personal computer, a liquid crystal television set, a viewfinder-type or direct-view monitor type video tape recorder, a car navigation system, a pager, an electronic organizer, an electronic calculator, a word processor, a workstation, a videophone, a POS terminal, and a touch-panel-equipped device. The invention is applicable to various types of electronic devices.

The invention is applicable to a reflective liquid crystal device (LCOS) in which an element is formed on a silicon substrate, a plasma display panel (PDP), a field emission display (FED and SED), an organic EL display, a digital micro mirror device (DMD), and an electromigration device, in addition to the liquid crystal device of the above-described embodiment.

The invention is not limited to the above-described embodiments and may be properly modified without departing from the scope of the invention which can be read from claims and whole specification. An electro-optical device including the modification and an electronic apparatus including the electro-optical device are included in the technical range of the invention.

The entire disclosure of Japanese Patent Application No. 2008-041245, filed Feb. 22, 2008 is expressly incorporated by reference herein.

What is claimed is:

1. An electro-optical device comprising:
   unit pixels arranged in a pixel region, one of the unit pixels including a red sub pixel for displaying the color red, a green sub pixel for displaying the color green, and a blue sub pixel for displaying the color blue;
   data lines juxtaposed side by side in a first direction in the pixel region, and including a red data line electrically connected to the red sub pixel, a green data line electrically connected to the green sub pixel, and a blue data line electrically connected to the blue sub pixel, each of the red data line, the green data line, and the blue data line extending in a second direction;
   image signal lines disposed in a peripheral region located at the periphery of the pixel region, the image signal lines supplying image signals;

a red sampling switch electrically connected to the red data line that samples and supplies image signals to the red data line;
a green sampling switch electrically connected to the green data line and that samples and supplies image signals to the green data line; and
a blue sampling switch electrically connected to the blue data line and that samples and supplies image signals to the blue data line,
wherein:
the green sampling switch is located at a position that is closer to the pixel region than are the red sampling switch and the blue sampling switch, and
the red sampling switch, the green sampling switch, and the blue sampling switch are aligned with each other in the second direction.

2. The electro-optical device according to claim 1, wherein the blue sampling switch is located at a position that is farther from the pixel region than is the red sampling switch.

3. An electronic apparatus comprising the electro-optical device according to claim 1.

* * * * *